United States Patent [19]

Taylor, Jr.

[11] 4,394,945
[45] Jul. 26, 1983

[54] VALVE HAVING SUCK-BACK FEATURE

[75] Inventor: James H. Taylor, Jr., Plainville, Conn.

[73] Assignee: Loctite Corporation, Newington, Conn.

[21] Appl. No.: 290,421

[22] Filed: Aug. 6, 1981

[51] Int. Cl.³ ............................................. B65D 5/72
[52] U.S. Cl. .............................. 222/571; 137/516.27; 141/117
[58] Field of Search ............... 222/108, 109, 110, 511, 222/518, 571; 141/115, 116, 117; 239/570; 137/516.27; 251/60, 210

[56] References Cited

U.S. PATENT DOCUMENTS

| | | | |
|---|---|---|---|
| 2,721,008 | 10/1955 | Morgan, Jr. | 222/571 X |
| 3,315,899 | 4/1967 | Quarve | 239/586 |
| 3,547,148 | 12/1970 | Drori | 141/116 X |
| 4,062,480 | 12/1977 | Bjorklund | 222/571 |
| 4,119,058 | 10/1978 | Schmermund | 222/571 X |
| 4,142,707 | 3/1979 | Bjorklund | 222/571 X |

Primary Examiner—Joseph J. Rolla
Assistant Examiner—Michael S. Huppert
Attorney, Agent, or Firm—Watson, Cole, Grindle & Watson

[57] ABSTRACT

A valve assembly has a spring-biased discharge valve seated for closing the discharge whereafter product is sucked back from a discharge nozzle during a continued movement of the valve in the direction of closing. Parts of the valve may be relatively adjusted for regulating the amount of suck-back flow of product from the nozzle.

8 Claims, 4 Drawing Figures

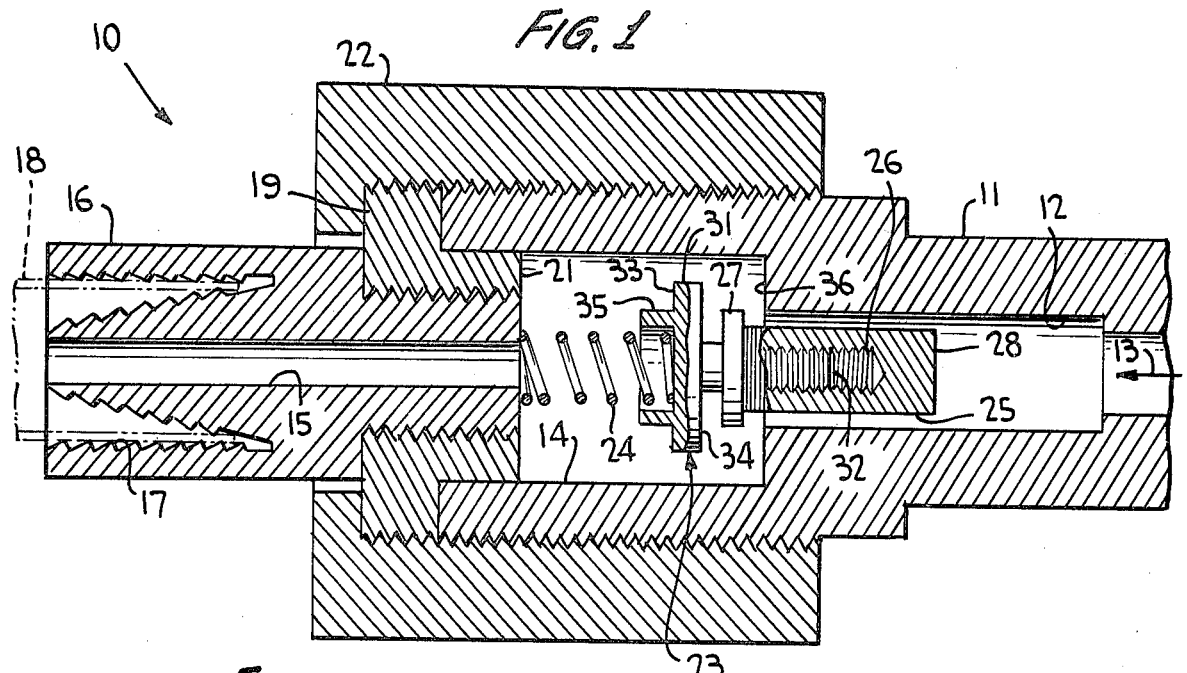
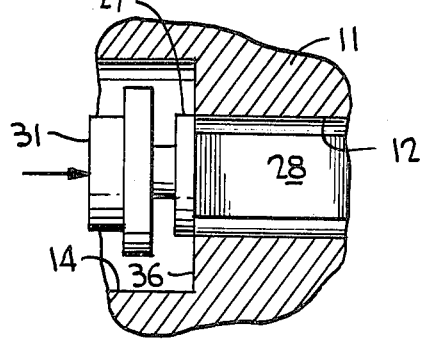
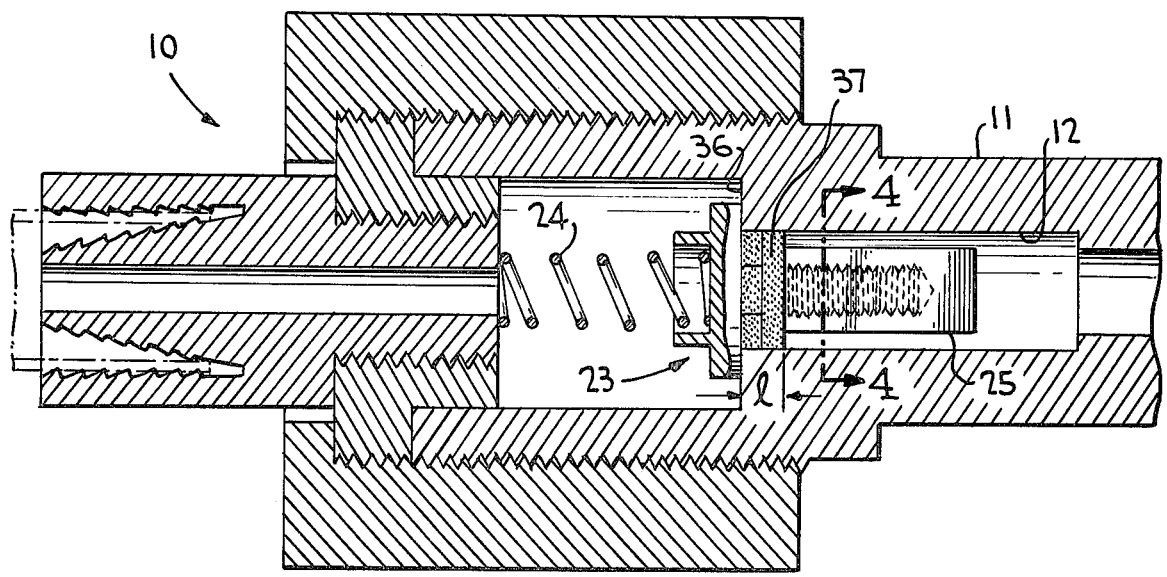

VALVE HAVING SUCK-BACK FEATURE

BACKGROUND OF THE INVENTION

This invention relates generally to a valve assembly for controlling the outlet from a liquid dispenser, and more particularly to such an assembly which is capable of effecting a suck-back flow of liquid from its nozzle after closing the discharge passage.

Valve or nozzle assemblies of the general class herein, having a suck-back valve or draw-back capability after closing the discharge, include some type of discharge valving, and a chamber downstream thereof in communication with the nozzle for effecting a suck-back flow of liquid from the nozzle upon an increase in volume in the chamber. The simplest approach includes the use of a hand-operated plunger which forces the liquid, such as an adhesive, out of a discharge nozzle from an adjoining chamber containing the liquid, and subsequent retraction of the plunger draws-back product from the nozzle to prevent product extrusion from the nozzle tip after a predetermined amount is dispensed or applied to a workpiece. This has proven largely ineffective for accurately cutting of the flow of product through the nozzle for liquids of different viscosities, and is obviously unsuitable for large scale dispensing operations. Other valve arrangements provide for a more precise cutting off of the flow of product from the nozzle after a closing of the discharge valve. However, many of such arrangements require relatively movable parts to effect a suck-back flow from the nozzle, or separate elements for closing the discharge and thereafter creating the suck-back flow. Otherwise, external means are required for carrying out the discharge closing and/or draw-back operations. These various prior art approaches thus require numerous parts and external functions which add to the complexity and cost of the valve arrangement and are more cumbersome to operate.

SUMMARY OF THE INVENTION

It is therefore an object of the present invention to provide a valve assembly of the general class aforedescribed having the capability of a drawing-back the flow of product from the nozzle after valve closing, in a more accurate and precise manner, requiring few moving parts, without the need of external sources for moving any of the parts, and in a manner which automatically closes the discharge and thereafter creates the suck-back flow.

Another object of this invention is to provide such a valve assembly wherein the discharge valve is spring-biased into a valve closing position and is forced into a valve opening position in response to pressurized product from the dispenser which overcomes the force of the spring, the valve having a portion engaging the valve seat and an axially spaced stop shoulder permitting continued movement of the valve after closing until the shoulder engages an abutment wall, the valve portion and stop shoulder being disposed in a chamber in communication with the nozzle to thereby effect expansion of the chamber, and thus a suck-back flow, during such continued movement.

A further object of this invention is to provide such a valve assembly wherein the valve includes a body member extending from the valve portion upstream of the valve seat and in sliding engagement with the wall of the discharge passage for guiding the valve between its opening and closing positions, liquid passageways being defined along such body member to facilitate flow of product through the open valve seat.

A still further object of the present invention is to provide such an assembly wherein the valve comprises a pair of valve elements which respectively include the valve portion and the stop shoulder, such elements being interconnected for adjusting the spacing between the valve portion and the stop shoulder to thereby regulate the extent of suck-back flow by changing the amount of chamber volume expansion for a particular product to be dispensed or for a specific dispensing operation.

Other objects, advantages and novel feature of the present invention will become more apparent from the following detailed description of the invention when taken in conjunction with the accompanying drawings.

BRIEF DESCRIPTION OF THE DRAWINGS

FIG. 1 is a vertical sectional view of the valve assembly according to an invention with the discharge valve open;

FIG. 2 is a partial vertical sectional view of the present valve assembly with the discharge valve at its initial position of closing;

FIG. 3 is a view similar to FIG. 1 with the discharge valve closed followed by a suck-back flow of product from the nozzle; and FIG. 4 is a cross-sectional view taken substantially along the line 4—4 of FIG. 3.

DETAILED DESCRIPTION OF THE INVENTION

Turning now to the drawings wherein like reference characters refer to like in corresponding parts throughout the several views, the valve assembly according to the invention is generally designated 10 and includes a housing 11 containing a liquid discharge passage 12 extending from a dispensing apparatus (not shown) of some type having a pump plunger for discharging a liquid product, in the direction of arrow 13 of FIG. 1, from a product containing pump chamber. Housing 11 also contains a chamber 14 forming an extension of passage 12 and communicating with a nozzle passage 15 of a nozzle or dispensing member 16. The terminal end of the nozzle is provided with an annular inwardly tapering groove 17 for the reception of tubing 18, shown in phantom outline in FIG. 1, press-fitted within the groove and being provided as desired.

A collar 19 is threaded onto an inner end of the nozzle and has an inner surface 21 forming part of the forward wall of chamber 14, and a retaining nut 22 threadedly engages the housing and collar 19 for securing the parts together.

The valve assembly according to the invention includes a discharge valve 23 which is spring biased into its valve closing position of FIGS. 2 and 3 by a return spring 24 bearing against the inner wall of the nozzle. The valve comprises a valve element 25 having a central internally threaded bore 26, a portion at its forward end defining an annular flange 27, and a body member 28 extending from the flange in an upstream direction for sliding engagement with the wall of passage 12. As shown in FIG. 4, the wall of passage 12 is circular for the reception of flange 27 which is likewise circular, the passage 12 and flange 27 diameters being substantially the same so as to permit a snug and fluid tight fit of the flange within the passage in a valve closing position to be more fully described hereinafter. The flange is designed to slide into and beyond a valve closing position along the wall of passage 12 without interruption, and is guided for axial movement between opening and closing positions as its body member 28 slidingly engages the wall. As shown in FIG. 3, the body member is of rectangular cross-section for engagement with the wall of the discharge passage along its four corners. Liquid passageways 29 are thus defined between valve element 25 and discharge passage 12 along body member 28. Of course, discharge passageways could alternatively be defined between a circular body member 28 and a rectangular discharge passage wall without departing from the invention. Flange 27 would accordingly be designed as rectangular to snugly fit within the discharge passage as aforedescribed. Other complementary shapes for flange 27 and the wall of the discharge passage are possible without the departing from the invention. Otherwise, passageways 29 could be formed by an axial groove or grooves at the periphery of body member 28.

Valve 23 further comprises another valve element 31 having a threaded shank 32 in threaded engagement with bore 26. An enlarged disc 33 of element 31 is fixed to this shank 32 and defines a stop shoulder at its inner surface 34. A spring retention cup 35 extends from the opposite surface of disc 33 for the reception of the inner end of coil spring 24.

The outer end of passage 12 essentially defines a valve seat for valve portion 27 which closes the discharge, when the valve moves in the direction of the arrow of FIG. 2, as soon as the inner end of portion 27 becomes juxtaposed to wall of passage 12. As will be described more fully hereinafter, the valve continues to move in this direction after closing until disc 33 bears against an abutment wall 36, as shown in FIG. 3, the abutment wall being defined between shoulder 14 and the wall of the discharge passage.

The liquid product to be despensed may comprise, but is not limited to, a highly viscous liquid adhesive which tends to string at the nozzle tip if care is not taken to cut off or draw-back the flow from the nozzle.

In operation, liquid product is pumped under pressure from the dispensing apparatus in the direction of arrow 13 thereby pressurizing passage 12 to the extent necessary to overcome the force of spring 24 whereupon pressure exerted against the inner surface of element 25 moves the valve from its closed position of FIG. 3 to its open position of FIG. 1.

The valve opens as its valve portion 27 moves away from the valve seat, i.e., slightly to the left from its position shown in FIG. 2, and continues to move leftward to its FIG. 1 position for so long as the liquid pressure upstream of the valve is maintained in excess of the return force of the spring. The product flows outwardly of the nozzle, and product continues to initially be pumped through the open discharge valve until the valve assembly is purged of unwanted air. Discharge passage chamber 14 and nozzle passage 15 are therefore now substantially filled with product without air voids. Upon release of pump pressure upstream of the valve assembly to a level below the return force of the spring, the valve is moved toward its closing position in the direction of the arrow of FIG. 2 and, when valve portion 27 reaches this FIG. 2 position in which it begins to fully close passage 12, the discharge is shut-off and product ceases to flow out of the nozzle. However, to avoid dripping of product from the nozzle after valve closing, or to avoid the stringing of a highly viscous adhesive product formed at the nozzle tip after valve closing, the present invention provides for a suck-back flow of product from the nozzle after the discharge valve closes passage 12. To create this suck-back flow, chamber 14 is expanded after valve closing to thereby produce a sub-atmospheric pressure in the chamber whereby the pressure differential between the chamber and the ambient outside the nozzle forces product from the nozzle passage into the chamber and prevents unwanted extrusion of product from the nozzle tip after valve closing. This increase in chamber volume is simply effected upon the continued closing movement of valve 23 from the initial closing position of FIG. 2 to its FIG. 3 positional whereupon surface 34 of disc 33 bears against abutment wall 36. It can be seen that from the initial valve closing position of FIG. 2, the chamber volume increases by an amount equal to an area A bounded by the periphery of flange 27 multiplied by a length of travel of the flange into passage 12. This amount of chamber volume increase is represented in FIG. 3 by a stippled area 37. Length l of travel can be varied by the relative threading or unthreading of elements 25 and 31 to thereby change the spacing between disc 33 and flange 27. Thus, if the valve elements were fully threaded together, the spacing therebetween would be zero, and the minimum amount of chamber-volume increase would be equal to the area A bounded by the periphery of flange 27 multiplied by the flange thickness. With the valve elements unthreaded a desired amount, the length l of flange travel into the discharge passage is increased accordingly, and the volume of chamber 14 (as it existed in the FIG. 2 position) effectively increases by an amount $A \times l$ wherein l is a multiple of flange thickness. The extent of increase in chamber volume may thus be varied for regulating the amount of suck-back flow from the nozzle depending on the type of product to be dispensed and/or the nature of the dispensing operation. The aforedescribed adjustment of valve elements relative to one another can be effected by disassembling the valve assembly. Otherwise, a suitable tool could be inserted through nozzle passage 15 to rotate valve element 31.

From the foregoing, can be seen that a valve assembly having a suck-back feature has been devised for each and economical operation and manufacture with few moving parts yet is highly effective in automatically expanding the chamber which is in communication with the nozzle. And, the chamber expansion can be varied by a simple adjustment of the valve elements relative to each other.

Obviously, many other modifications in the variations in the present invention are made possible in the light of the above teaching. It is therefore to be understood that within the scope of the appended claims the invention may be practiced otherwise than as specifically described.

What is claimed is:

1. In a valve assembly comprising a housing containing a liquid discharge passage, a discharge nozzle extending from said passage, a discharge valve in said passage for closing the flow of liquid therethrough upon engagement with a valve seat, and said passage downstream of said valve defining a variable volume chamber in communication with said nozzle for creating a suck-back flow of liquid from said nozzle upon an increase in volume of said chamber, the improvement wherein said valve is spring-biased into a closing position and is moved into an open position in response to a predetermined level of liquid pressure in said passage upstream thereof, said valve having a portion engaging said valve seat in said closing position, said valve seat being defined by the wall of said discharge passage upstream of said variable volume chamber, and said valve having a stop shoulder thereon axially spaced from said valve portion, the wall of the variable volume chamber adjacent to said valve seat defining an abutment, said stop shoulder and said valve portion being disposed in said chamber adjacent said abutment, said stop shoulder and said valve portion being disposed in said chamber when said discharge valve is in said open position, whereby upon a decrease of said liquid pressure below said predetermined level said valve moves into said closing position and thereafter continues movement upstream into said passage until said stop shoulder and said abutment interengage the volume of said chamber thereby expanding to effect said suck-back flow of liquid from said nozzle.

2. The valve assembly according to claim 1, wherein said valve comprises separate valve elements on which said valve portion and said stop shoulder are respectively located, said valve elements being interconnected for adjusting the spacing between said valve portion and said stop shoulder, whereby the extent of movement of said valve out of said chamber may be regulated for controlling the amount of volume change of said chamber and thus the extent of said suck-back flow.

3. The valve assembly according to claim 2, wherein said valve portion comprises a flange.

4. The valve assembly according to claim 2, wherein said valve element on which said valve portion is located has a body portion extending from said valve portion in sliding engagement with said wall of said passage upstream of said variable volume chamber, one of said wall and said body portion being of circular cross-section and the other of said wall and said body portion being of rectangular cross-section to define passageways therebetween for the passage of liquid through said valve when open.

5. In a valve assembly of the type having a discharge valve for closing a liquid discharge passage from which a discharge nozzle extends, a chamber in communication with said nozzle, means for expanding the volume of said chamber for effecting a suck-back flow of liquid from said nozzle after a closing of said valve, the improvement wherein said valve is moved into closed and open positions respectively by a return spring acting on a downstream end thereof and by pressurized liquid acting on the opposite end thereof sufficient to overcome the spring force, a portion at said opposite end of said valve engaging the wall of said passage upstream of said chamber in said closed position, said wall terminating in an abutment forming a wall of said chamber, and said valve having a stop shoulder spaced from said valve portion, whereby said valve comprises said volume expanding means upon continued movement thereof into said passage after reaching said closed position until said abutment and said shoulder interengage.

6. The valve assembly according to claim 5, wherein said valve has a body member extending from said valve portion into said passage upstream of said chamber for guiding said valve during movement between said closed and open positions, and means defining at least one liquid passageway along said body member to facilitate flow of liquid through said open valve.

7. The valve assembly according to claim 6, wherein one of said body member and said passage wall is of circular cross-section and the other of said body member and said passage wall is of rectangular cross-section thereby defining liquid passageways therebetween.

8. The valve assembly according to claim 5, 6 or 7, wherein said valve comprises a pair of valve elements respectively including said stop shoulder and said valve portion, said valve elements being interconnected for relative adjustment of said valve portion and said stop shoulder toward and away from one another, whereby the extent of volume expansion of said chamber, and thus the amount of suck-back flow, is capable of being regulated.

* * * * *